(12) United States Patent
Thiel et al.

(10) Patent No.: US 6,405,520 B1
(45) Date of Patent: Jun. 18, 2002

(54) GAS AND STEAM TURBINE PLANT AND METHOD FOR COOLING A COOLANT OF A GAS TURBINE OF SUCH A PLANT

(75) Inventors: Hans-Joachim Thiel, Erlangen; Klaus Gebke, Gelnhausen; Thomas Greis, Darmstadt; Alfred Reichard, Erlangen, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/441,536

(22) Filed: Nov. 16, 1999

Related U.S. Application Data

(63) Continuation of application No. PCT/DE98/01200, filed on Apr. 30, 1998.

(30) Foreign Application Priority Data

May 16, 1997 (DE) .......................... 197 20 654

(51) Int. Cl.⁷ .............................. F02C 6/18; F02C 7/14
(52) U.S. Cl. .................................. 60/39.02; 60/39.182
(58) Field of Search ........................... 60/39.02, 39.182

(56) References Cited

U.S. PATENT DOCUMENTS 5,491,971 A * 2/1996 Tomlinson et al. ...... 60/39.182
5,661,968 A * 9/1997 Gabriel ..................... 60/39.182

* cited by examiner

Primary Examiner—Louis J. Casaregola
(74) Attorney, Agent, or Firm—Herbert L. Lerner; Laurence A. Greenberg; Werner H. Stemer

(57) ABSTRACT

A gas and steam-turbine plant includes a waste-heat steam generator connected downstream of a gas turbine on the flue-gas side. The waste-heat steam generator has heating areas connected in a water/steam circuit of a steam turbine. A heat exchanger is provided for cooling a coolant of the gas turbine in order to ensure reliable cooling of the gas turbine even under varied operating conditions. The heat exchanger has a secondary side connected in a second water/steam circuit. The second water/steam circuit is connected to the water/steam circuit of the steam turbine in such a way that it can be shut off. A method is also provided for cooling a coolant of a gas turbine of a gas and steam-turbine plant.

10 Claims, 1 Drawing Sheet

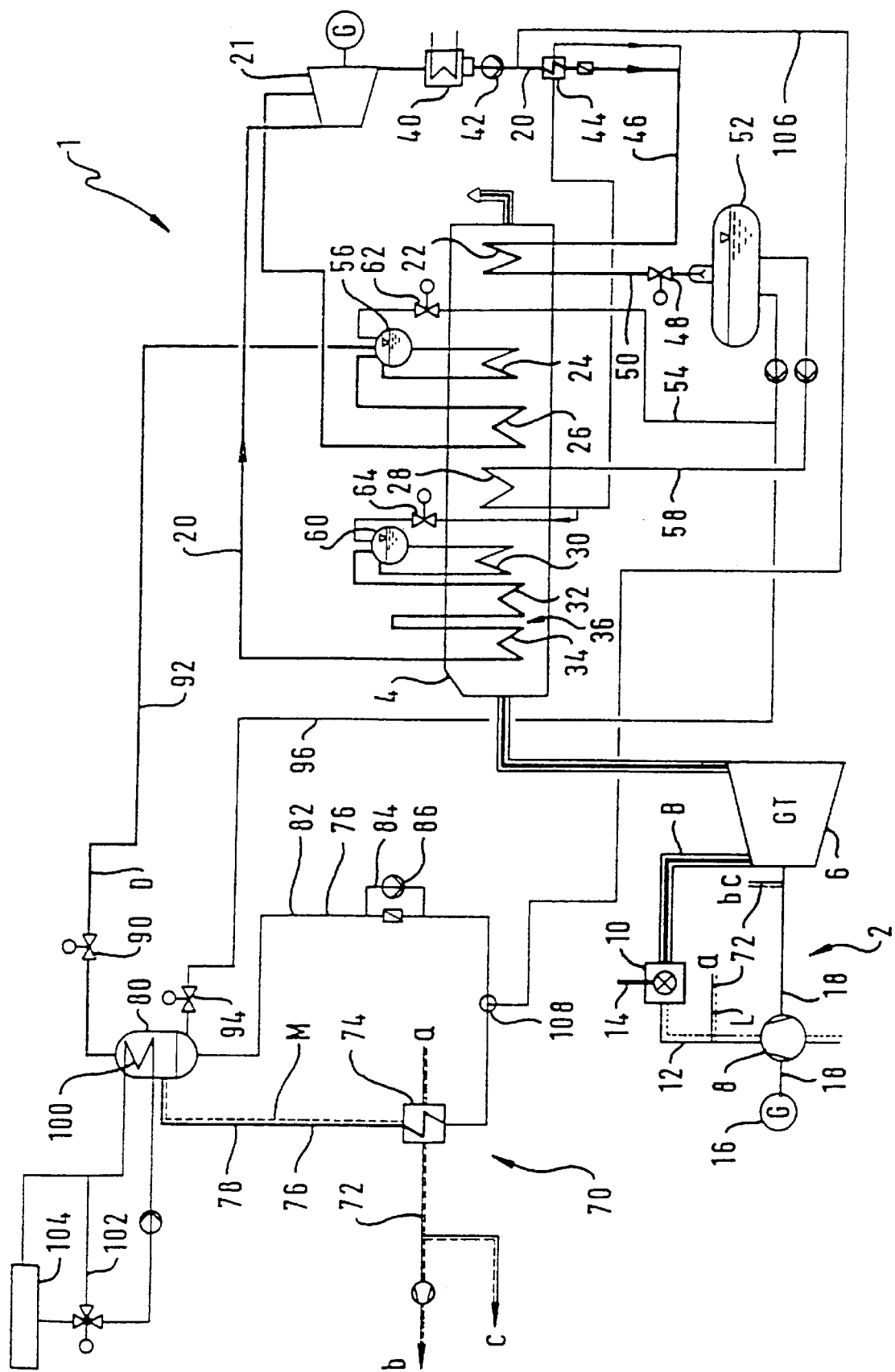

GAS AND STEAM TURBINE PLANT AND METHOD FOR COOLING A COOLANT OF A GAS TURBINE OF SUCH A PLANT

CROSS-REFERENCE TO RELATED APPLICATION:

This application is a continuation of copending International Application No. PCT/DE98/01200, filed Apr. 30, 1998, which designated the United States.

BACKGROUND OF THE INVENTION

Field of the Invention

The invention relates to a gas and steam-turbine plant having a waste-heat steam generator which is connected downstream of a gas turbine on the flue-gas side and which has heating areas that are connected in a water/steam circuit of a steam turbine. The invention also relates to a method of cooling a coolant of the gas turbine of the gas and steam-turbine plant.

In a gas and steam-turbine plant, heat contained in an expanded working medium (flue gas) from the gas turbine is utilized in order to generate steam for the steam turbine. The heat transfer is effected in a waste-heat steam generator, which is connected downstream of the gas turbine on the flue-gas side and in which heating areas in the form of tubes or tube banks are disposed. The latter in turn are connected in the water/steam circuit of the steam turbine. The water/steam circuit normally includes several, for example two, pressure stages, wherein each pressure stage has a preheating heating area and an evaporator heating area.

In an evaporator circuit designated as having natural circulation, partial evaporation of a conducted working medium takes place in the evaporator. Circulation of the working medium is ensured by pressure differences which develop during the evaporation process and/or by a geodetic configuration of the evaporator and a steam drum. As an alternative, the evaporator circuit may also be a forced circulation circuit, in which the circulation of the working medium is ensured by a circulating pump and the working medium is likewise at least partly evaporated in the evaporator. In the case of both the natural circulation and the forced circulation, the water/steam mixture is fed from the evaporator to a steam drum connected in the evaporator circuit. Water and steam are separated in the steam drum, with the water being fed again from the steam drum to the evaporator.

Alternatively, in an evaporator circuit constructed as a once-through steam generator, complete evaporation of the working medium may also be provided in one pass through the evaporator with subsequent partial superheating. In that case, the passage of the working medium through the evaporator is likewise ensured by pumps.

Irrespective of whether the natural-circulation, the forced-circulation or the once-through principle is used in the steam-turbine plant, an especially high temperature of the flue gas at the inlet to the gas turbine of, for example, 1000 to 1200° C. is the goal. That is aim at in order to increase the performance of the gas turbine and thus achieve as high an efficiency of such a gas and steam-turbine plant as possible. However, such a high turbine inlet temperature involves material problems, in particular with regard to heat resistance of the turbine blades.

An increase in the turbine inlet temperature may be permitted when the turbine blades are cooled to such an extent that they are always at a temperature which is below the admissible material temperature. To that end, it is known from European Patent 0 379 880 B to branch off a partial flow of compressed air flowing off from a compressor allocated to the gas turbine and to feed that partial flow as coolant to the gas turbine. The air which serves as the coolant is cooled before entry into the gas turbine. In the process, the heat extracted from the cooling air during the cooling is utilized as heat of evaporation and is used to drive the steam turbine. A flash evaporator having a circulating pump and a flash vessel is used as the evaporator system. In that case, water is removed from the steam drum of the evaporator circuit, that water is heated up by heat exchange with the cooling air serving as the coolant for the gas turbine and it is then evaporated by flashing in the flash vessel. The steam which is thus produced is fed to the steam turbine.

Such an apparatus for cooling the cooling air of a gas turbine is constructed for a certain temperature difference between the water removed from the steam drum and the cooling air. In that case, the operation of the entire waste-heat steam generator is necessary for reliable cooling of the gas turbine. Such a gas and steam-turbine plant can therefore only be used in a flexible manner to a limited extent.

German Patent DE 43 33 439 C1, corresponding to U.S. Pat. No. 5,661,968, discloses a gas and steam-turbine plant in which an intermediate circuit that is provided for cooling the cooling air of the gas turbine transfers heat carried in the cooling air to the water/steam circuit assigned to the steam turbine. However, in the case of that apparatus, particularly effective cooling of the cooling air is dependent on the operational readiness of the steam turbine, with the result that the flexibility of use of that plant is restricted.

SUMMARY OF THE INVENTION

It is accordingly an object of the invention to provide a gas and steam-turbine plant in which reliable cooling of the gas turbine is ensured even under various operating conditions and a method for cooling a coolant of a gas turbine of such a plant that is especially suitable for various operating conditions, which overcome the hereinafore-mentioned disadvantages of the heretofore-known devices and methods of this general type.

With the foregoing and other objects in view there is provided, in accordance with the invention, a gas and steam-turbine plant, comprising a gas turbine for receiving a coolant, the gas turbine having a flue-gas side; a steam turbine having a water/steam circuit; a second water/steam circuit to be selectively connected to and shut off from the water/steam circuit of the steam turbine; a waste-heat steam generator connected downstream of the flue-gas side of the gas turbine, the waste-heat steam generator having heating areas connected in the water/steam circuit of the steam turbine; and a heat exchanger for cooling the coolant of the gas turbine, the heat exchanger having a secondary side connected in the second water/steam circuit.

The invention is based on the concept that, in the case of a gas and steam-turbine plant which can be used in an especially flexible manner, the gas turbine should be operable independently of the waste-heat steam generator and thus also independently of the steam turbine. Even during solo operation of the gas turbine, reliable cooling of its is turbine blades should be ensured. To this end, a cooling system which is independent of the water/steam circuit of the steam turbine is provided for cooling the coolant of the gas turbine.

In accordance with another feature of the invention, the heat exchanger is constructed as an evaporator for the second water/steam circuit. In this case, during normal operation of the gas and steam-turbine plant, the steam obtained in the second water/steam circuit can be expediently fed to the water/steam circuit of the steam turbine.

In accordance with a further feature of the invention, there is provided a steam drum connected in the second water/ steam circuit for separating the steam from the water/steam mixture flowing off from the heat exchanger.

In accordance with an added feature of the invention, the steam drum has an integrated condenser.

In accordance with an additional feature of the invention, in order to provide an especially favorable recovery of the heat extracted from the coolant of the cooling system, a steam line which can be shut off and through which the steam generated in the second water/steam circuit can be fed into a steam drum connected in the water/steam circuit of the steam turbine, is connected to the steam drum connected in the second water/steam circuit.

In accordance with yet another feature of the invention, the separate water/steam circuit can be operated by natural circulation for an especially simple type of construction and for an especially low cost in terms of assembly and installation.

In accordance with yet a further feature of the invention, the steam drum connected in the second water/steam circuit is connected to a secondary cooling circuit, so that the heat extracted from the cooling air when it is being cooled is reliably discharged even during solo operation of the gas turbine. In this case, the secondary cooling circuit may, for example, contain a cooling tower.

With the objects of the invention in view there is also provided a method for cooling a coolant of a gas turbine of a gas and steam-turbine plant, which comprises cooling the coolant by heat exchange with a medium carried in a water/steam circuit independent of the steam turbine.

In accordance with another mode of the invention, the medium carried in the independent water/steam circuit is at least partly evaporated during the heat exchange with the coolant.

In accordance with a concomitant mode of the invention, the independent water/steam circuit is operated by natural circulation.

The advantages achieved by the invention reside in particular n the fact that reliable cooling of the gas turbine irrespective of the operating state of the steam turbine is ensured by the cooling of the coolant of the gas turbine by heat exchange with a medium carried in a water/steam circuit which is independent of the steam turbine. The gas turbine can therefore be reliably operated even during various operating states of the gas and steam-turbine plant, in particular even during solo operation. In addition, due to the connection between the second water/steam circuit and the water/steam circuit of the steam turbine, which connection can be shut off, the heat extracted from the cooling air of the gas turbine when the cooling air is being cooled can be returned into the energy-generation process during normal operation of the gas and steam-turbine plant. The gas and steam-turbine plant can therefore be operated especially efficiently during normal operation.

Other features which are considered as characteristic for the invention are set forth in the appended claims.

Although the invention is illustrated and described herein as embodied in a gas and steam turbine plant and a method for cooling a coolant of a gas turbine of such a plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The FIGURE of the drawing is a schematic and block diagram of a gas and steam-turbine plant having a cooling system for cooling a coolant for a gas turbine.

DESCRIPTION OF THE PREFERRED EMBODIMENTS

Referring now in detail to the single FIGURE of the drawing, there is seen a gas and steam-turbine plant 1 which is schematically shown in the FIGURE and includes a gas-turbine plant 2 having a waste-heat steam generator 4 connected downstream on a flue-gas side. The gas-turbine plant 2 includes a gas turbine 6 having a coupled air compressor 8. A combustion chamber 10 which is connected upstream of the gas turbine 6 is also connected to a fresh-air line 12 of the air compressor 8. A fuel line 14 leads into the combustion chamber 10 of the gas turbine 6. The gas turbine 6 and the air compressor 8 as well as a generator 16 are disposed on a common shaft 18.

The waste-heat steam generator 4, which is connected downstream of the gas turbine 6 of the gas-turbine plant 2 on the flue-gas side, has a number of heating areas, which are connected in a water/steam circuit 20 of a steam turbine 21. In this case, the heating areas are a condensate preheater 22, a low-pressure evaporator 24, a low-pressure superheater 26, a high-pressure preheater 28, a high-pressure evaporator 30 and a high-pressure superheater 36 formed of two sections 32, 34.

A condenser 40, which is connected downstream of the steam turbine 21 on a steam side, is also connected to the condensate preheater 22 through a condensate pump 42, a preheater 44 disposed outside the waste-heat steam generator 4 and a condensate feed 46. The condensate preheater 22 has an outlet side which is connected through a feed line 50 to a feedwater tank 52. The feed line SO can be shut off by a control valve 48. A feed line 54 is disposed on an outlet side of the feedwater tank 52 for feeding feedwater into a steam drum 56 connected to the low-pressure evaporator 24. Furthermore, the feedwater tank 52 is connected on the outlet side through a feed line 58 to the high-pressure preheater 28. The high-pressure preheater 28 in turn is connected on an outlet side to a steam drum 60 connected to the high-pressure evaporator 30. The feed lines 54, 58 can each be shut off by a respective control valve 62, 64.

The steam drums 56 and 60 are respectively connected through the low-pressure superheater 26 and the high-pressure superheater 36 to a low-pressure part and a high-pressure part of the steam turbine 21, so that the closed water/steam circuit 20 results.

The gas-turbine plant 2 is constructed for achieving an especially high efficiency. To that end, an entry of flue gas B into the gas turbine 6 is provided with a temperature of about 1000 to 1200° C. during operation of the gas-turbine plant 2. In order to reliably avoid material problems in the process, in particular those associated with heat resistance of turbine blades of the gas turbine 6, a cooling system 70 is allocated to the gas-turbine plant 2.

In this case, air L originating from the air compressor 8 is provided as a coolant for the gas turbine 6. This air L can be fed directly to the gas turbine 6 through a coolant line 72 branching off from the fresh-air line 12, while bypassing the combustion chamber 10.

In order to cool the air L which is provided as the coolant, the cooling system 70 includes a heat exchanger 74 which has a primary side connected in the coolant line 72. The heat exchanger 74 also has a secondary side which is connected in a second water/steam circuit 76 that is independent of the water/steam circuit 20 of the steam turbine 21. To this end, the heat exchanger 74 is constructed as an evaporator for a medium M circulating in the second water/steam circuit 76 and has an outlet side connected through a water/steam line 78 to a steam drum 80 having an integrated condenser. The steam drum 80 is connected to the heat exchanger 74 through a condensate line 82.

In this case, the second water/steam circuit 76 is constructed for natural circulation. A circulating pump 86 which is connected in a bypass loop 84 of the condensate line 82 is provided only for a start-up phase.

The second water/steam circuit 76 is connected to the water/steam circuit 20 of the steam turbine 21 in such a way that it can be shut off. To this end, a steam line 92, which can be shut off by a valve 90, connects the steam drum 80 to the steam drum 56 that is constructed as a low-pressure drum. The steam drum 80 has a water side which is connected to the feed line 54 through a line 96 that can be shut off by a control valve 94.

A heat exchanger 100 which is disposed in the steam drum 80 is connected to a secondary cooling circuit 102. A cooling tower 104 is connected in the secondary cooling circuit 102.

The gas and steam-turbine plant 1 is constructed in such a way that reliable operation with reliable cooling of the gas turbine 6 is ensured even during various operating states. To this end, the air L which is provided as the coolant for the gas turbine 6 is cooled by heat exchange with the medium M carried in the water/steam circuit 76 that is independent of the steam turbine 21. The medium M which is at least partly evaporated during the heat exchange with the air L in the heat exchanger 74 is fed to the steam drum 80, where the steam that is generated is separated from the medium M which has not evaporated. During normal operation of the gas and steam-turbine plant 1, that is during joint operation of the gas turbine 6 and the steam turbine 21, steam D which is separated in the steam drum 80 is fed through the steam line 92 into the steam drum 56 when a valve 90 is opened. The heat extracted from the air L when it is being cooled in the heat exchanger 74 is therefore fed into the water/steam circuit 20 of the steam turbine 21 and is supplied for the generation of energy. The gas and steam-turbine plant 1 therefore works at an especially high efficiency.

The loss of medium M which occurs in the separate water/steam circuit 76 due to the feeding of the steam D into the water/steam circuit 20 of the steam turbine 21 is compensated for by feeding feedwater into the steam drum 80 through the line 96 when the control valve 94 is opened as required. Reliable and lasting operation of the second water/steam circuit 76 is therefore ensured.

However, the gas and steam-turbine plant 1 can also be operated with reliable cooling of the gas turbine 6 during solo operation of the gas-turbine plant 2, that is during operation of the gas turbine 6 when the steam turbine 21 is shut down. To this end, the valve 90 and the control valve 94 are closed during solo operation of the gas-turbine plant 2, so that the second water/steam circuit 76 is completely cut off from the water/steam circuit 20 of the steam turbine 21. The cooling of the gas turbine 6 is therefore also ensured during complete shutdown of the steam turbine 21 and the components allocated to its water/steam circuit 20. In this operating state, the heat extracted from the air L when it is being cooled is given off to the environment through the secondary cooling circuit 102. At the same time, the steam which is generated in the heat exchanger 74 is condensed in the steam drum 80 at its integrated condenser.

In order to enable the temperature level of the medium M circulating in the second water/steam circuit 76 to be adapted to varying requirements during the cooling of the air L, a further connecting line 106 is provided between the water/steam circuit 20 of the steam turbine 21 and the separate water/steam circuit 76. As viewed in the direction of flow of the medium, the connecting line 106 branches off from the water/steam circuit 20 of the steam turbine 21 downstream of the condenser 40 and leads out into an injector 108 connected in the condensate line 82. Cold condensate can be injected into the second water/steam circuit 76 through the injector 108 as and when required. In this case, the temperature of the medium M circulating in the separate water/steam circuit 76 can be varied by injection of the cold condensate and adapted to specific requirements during the heat exchange with the air L.

We claim:

1. A gas and steam-turbine plant, comprising:
   a gas turbine for receiving a coolant, said gas turbine having a flue-gas side;
   a steam turbine having a first water/steam circuit;
   a second water/steam circuit, said second water/steam circuit to be selectively connected to and shut off from said first water/steam circuit using at least one control member; and
   a heat exchanger for cooling the coolant of said gas turbine, said heat exchanger having a secondary side connected in said first water/steam circuit.

2. The gas and steam-turbine plant according to claim 1, wherein said heat exchanger is an evaporator for said second water/steam circuit.

3. The gas and steam-turbine plant according to claim 1, including a steam drum connected in said second water/steam circuit.

4. The gas and steam-turbine plant according to claim 3, wherein said steam drum connected in said second water/steam circuit has an integrated condenser.

5. The gas and steam-turbine plant according to claim 1, including a steam drum connected in said first water/steam circuit of said steam turbine, and a steam line for feeding steam generated in said second water/steam circuit into said steam drum connected in said first water/steam circuit of said steam turbine, said steam line being selectively shut off.

6. The gas and steam-turbine plant according to claim 1, wherein said second water/steam circuit is operable by natural circulation.

7. The gas and steam-turbine plant according to claim 3, including a secondary cooling circuit connected to said steam drum connected in said second water/steam circuit.

8. In a method for cooling a coolant of a gas turbine of a gas and steam-turbine plant having the gas turbine and a steam turbine, the improvement which comprises:
   providing a first water/steam circuit for cooling the coolant of the gas turbine and driving the steam turbine;
   selectively interconnecting and cooling the coolant by heat exchange with a medium carried in a second water/steam circuit.

9. The method according to claim 8, which further comprises at least partly evaporating the medium carried in the second water/steam circuit during the heat exchange with the coolant.

10. The method according to claim 8, which further comprises operating the second water/steam circuit by natural circulation.

* * * * *